(12) United States Patent
Hayakawa et al.

(10) Patent No.: US 8,248,724 B2
(45) Date of Patent: Aug. 21, 2012

(54) DISK DRIVE AND METHOD OF RE-INJECTING LOW DENSITY GAS IN A HERMETICALLY SEALED DISK ENCLOSURE OF A DISK DRIVE

(75) Inventors: Takako Hayakawa, Kanagawa (JP); Yoshiyuki Hirono, Kanagawa (JP); Hideaki Maeda, Kanagawa (JP); Masaru Muranishi, Kanagawa (JP); Kouki Uefune, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/488,501

(22) Filed: Jun. 19, 2009

(65) Prior Publication Data
US 2011/0038076 A1  Feb. 17, 2011

(30) Foreign Application Priority Data
Jun. 19, 2008 (JP) .................................. 2008-161052

(51) Int. Cl.
*G11B 33/14* (2006.01)
(52) U.S. Cl. .................................. 360/97.22; 360/97.12
(58) Field of Classification Search ............... 360/97.02, 360/97.03, 97.12, 97.22
See application file for complete search history.

(56) References Cited

U.S. PATENT DOCUMENTS

| | | | | |
|---|---|---|---|---|
| 5,454,157 A | * | 10/1995 | Ananth et al. | ............. 29/603.03 |
| 6,317,259 B1 | | 11/2001 | Matsui | |
| 6,507,452 B1 | | 1/2003 | Bae et al. | |
| 6,900,962 B1 | | 5/2005 | Forbord | |
| 7,218,473 B2 | * | 5/2007 | Bernett et al. | ............. 360/97.02 |
| 7,362,541 B2 | * | 4/2008 | Bernett et al. | ............. 360/97.02 |
| 7,570,454 B1 | * | 8/2009 | Andrikowich et al. | ..... 360/97.02 |
| 7,986,490 B2 | * | 7/2011 | Hirono et al. | ............. 360/97.02 |
| 2003/0179489 A1 | * | 9/2003 | Bernett et al. | ............. 360/97.01 |
| 2005/0068666 A1 | | 3/2005 | Albrecht et al. | |
| 2007/0159708 A1 | * | 7/2007 | Fukushima | ...................... 360/69 |
| 2007/0268621 A1 | * | 11/2007 | Bernett et al. | ............. 360/97.02 |
| 2008/0088969 A1 | * | 4/2008 | Uefune et al. | ............. 360/97.02 |
| 2008/0174910 A1 | * | 7/2008 | Hirono et al. | ............. 360/97.02 |
| 2008/0212237 A1 | * | 9/2008 | Uefune et al. | ................. 360/254 |
| 2008/0310048 A1 | * | 12/2008 | Hirono et al. | ............. 360/97.02 |

FOREIGN PATENT DOCUMENTS

| | | | | |
|---|---|---|---|---|
| JP | 61292289 A | * | 12/1986 | |
| JP | 62071078 A | * | 4/1987 | |
| JP | 62137790 A | * | 6/1987 | |
| JP | 62175986 A | * | 8/1987 | |
| JP | 62175988 A | * | 8/1987 | |
| JP | 62279591 A | * | 12/1987 | |
| JP | 01032482 A | * | 2/1989 | |
| JP | 06036548 A | * | 2/1994 | |
| JP | 08161881 | | 6/1996 | |
| JP | 10-055662 | | 2/1998 | |
| JP | 2002322444 A | * | 11/2002 | |
| JP | 2007280555 | | 10/2007 | |
| JP | 2007328880 A | * | 12/2007 | |
| JP | 2008090886 A | * | 4/2008 | |
| JP | 2008171512 A | * | 7/2008 | |
| JP | 2010-003356 | | 7/2010 | |

* cited by examiner

*Primary Examiner* — Will J Klimowicz

(57) ABSTRACT

A method for re-injecting low density gas into a disk drive including a hermetically sealed disk enclosure. The method includes providing a disk drive including a hermetically sealed disk enclosure. In addition, the method includes re-injecting low density gas from a hole penetrating the hermetically sealed disk enclosure from an exterior of the disk drive to an interior of the disk drive. Moreover, the method includes covering the hole with a sealing label including a metal layer and an adhesive layer.

8 Claims, 9 Drawing Sheets

US 8,248,724 B2

DISK DRIVE AND METHOD OF RE-INJECTING LOW DENSITY GAS IN A HERMETICALLY SEALED DISK ENCLOSURE OF A DISK DRIVE

CROSS-REFERENCE TO RELATED APPLICATION

This application claims priority from the Japanese Patent Application No. 2008-161052, filed Jun. 19, 2008, the disclosure of which is incorporated herein in its entirety by reference.

TECHNICAL FIELD

Embodiments of the present invention relate to disk drives and a method of re-injecting low density gas in a hermetically sealed disk enclosure (DE) of a disk drive.

BACKGROUND

In recent years, in response to market demand for increased capacity, higher recording density, and high-speed data accessing, HDDs spin magnetic-recording disks and actuate head gimbal assemblies (HGAs) to access data stored on magnetic-recording disks at greater speed than in the past. Consequently, mitigation of air turbulence, which buffets the magnetic-recording disks and HGAs, has arisen as an issue in the design of HDDs. Buffeting due to this turbulence can adversely affect positioning magnetic-recording heads in accessing data recorded with high recording density on a magnetic-recording disk. Since this turbulence occurs at random, estimating the magnitude and frequency of the resulting disturbance of the HGA for the swift and accurate positioning of magnetic-recording heads to access data has become complex and difficult. Moreover, the buffeting due to this turbulence may cause noise and impair the quiet operation of the HDD.

In addition, when a magnetic-recording disk is spun at high speed, the presence of the air inside the HDD causes an increase in electrical power consumption, because the air located in proximity to the magnetic-recording disk is drawn in and spun along with the magnetic-recording disk. In contrast, air located at greater distances from the magnetic-recording disk remains static so that shear forces arising between the static air and the air moving along with the magnetic-recording disk becomes a further load affecting the spin of the magnetic-recording disk. The increased electrical power consumption resulting from these shear forces is called windage loss, which becomes greater as the magnetic-recording disk spins at greater speed. To spin the magnetic-recording disk at high speed in the presence of this windage loss, a motor is utilized that has greater power output and consumes more electric power than in the absence of this windage loss.

SUMMARY

Embodiments of the present invention include a method for re-injecting low density gas into a disk drive including a hermetically sealed disk enclosure. The method includes providing a disk drive including a hermetically sealed disk enclosure. In addition, the method includes re-injecting low density gas from a hole penetrating the hermetically sealed disk enclosure from an exterior of the disk drive to an interior of the disk drive. Moreover, the method includes covering the hole with a sealing label including a metal layer and an adhesive layer.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
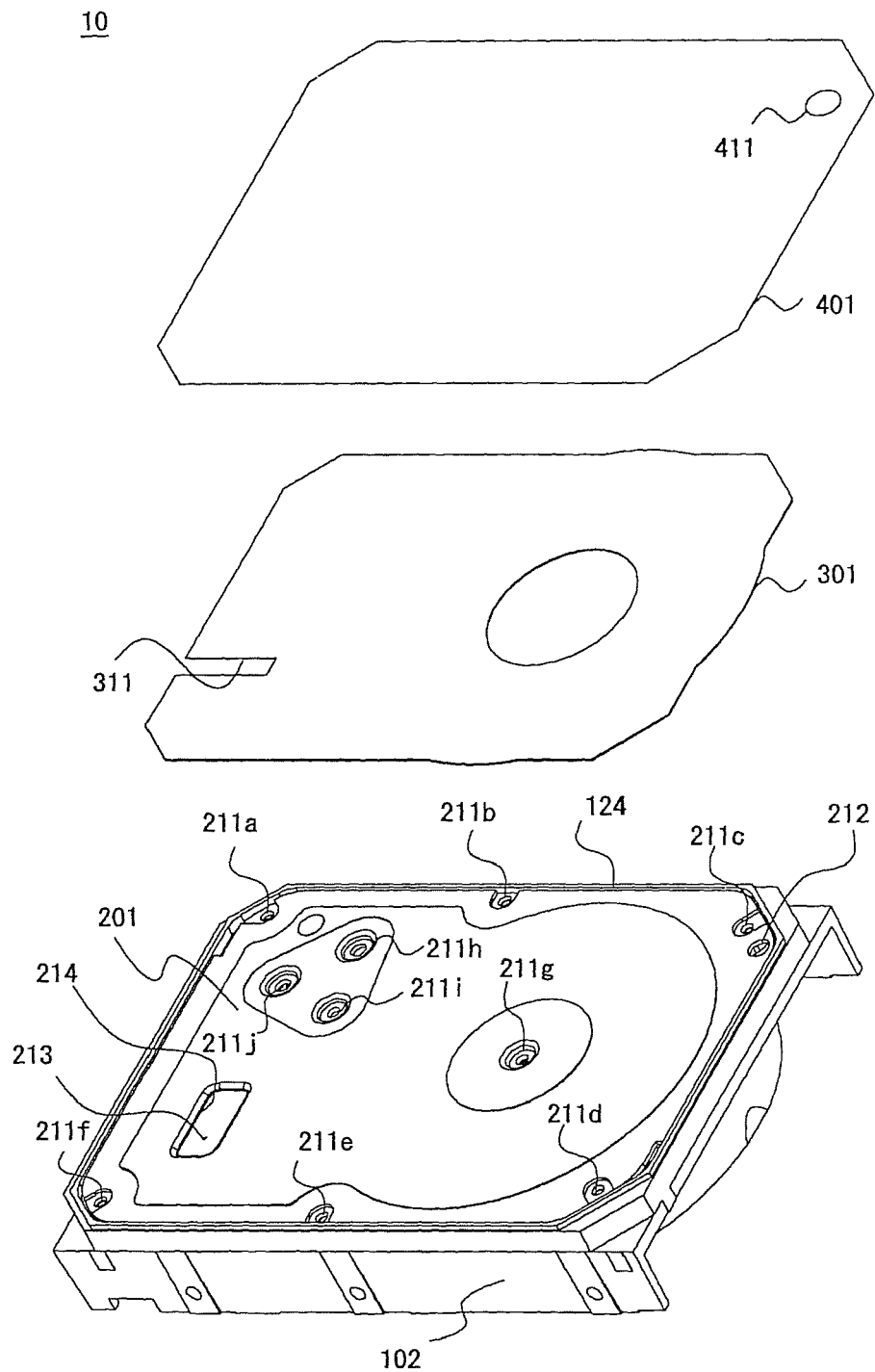
FIG. 1 is an exploded perspective view schematically depicting the structure of a hermetically sealed HDD, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Also, throughout the drawings, like components are denoted by like reference numerals, and their repetitive description is omitted if not necessary for the sake of clarity.

Description of Embodiments of the Present Invention for a Disk Drive and Method of Re-Injecting Low Density Gas in a Hermetically Sealed Disk Enclosure of a Disk Drive In accordance with embodiments of the present invention, in light of the fact that the air turbulence and the windage loss are proportional to the density of the gas inside the HDD, a low density gas instead of air may be used in a hermetically sealed HDD to reduce the air turbulence and the windage loss. Hydrogen, helium, and similar gases are examples of such a low density gas; but, helium, in particular, is effective, stable, and safe in light of the actual use. An HDD hermetically enclosed with helium gas can overcome some of the effects of air turbulence and windage loss and can provide swift and accurate positioning of the HGA, electrical power savings, and quiet operation, when compared with an HDD disk enclosure (DE) containing air. However, helium has very small molecules and a large diffusion coefficient. Consequently, DEs commonly used to seal HDDs are not sufficiently well sealed to prevent the low density gas from leaking out in normal use.

In accordance with embodiments of the present invention, since a low density gas such as helium gas can easily to leak out of the DE, welding or soldering are one means for sealing an HDD. If an HDD is determined to be defective during testing after assembling, some parts in the HDD may be replaced to repair the HDD. To make the repair work easier, it is desirable not to perform welding or soldering after hermetically enclosing the low density gas until after the completion of testing.

As is known in the art, a sealing method which employs double covers may be used to address this issue. This sealing method secures a primary cover, which employs a gasket with low permeability to helium gas and is easy to disassemble and replace, to the base until during testing, attaches a secondary cover after the successful completion of testing, and joins the primary cover and the secondary cover to seal an HDD by welding or soldering. Such a double covered structure allows easier disassembly and rework after testing while helium gas is hermetically enclosed in an HDD.

In accordance with embodiments of the present invention, to prevent helium gas from leaking out of a finished HDD, the HDD is tested to determine whether helium gas is leaking, or not, through the weld joint or solder joint of the secondary cover. If helium gas leak is detected in this test, the leak point is repaired by welding or soldering. If the leak hole is small and the leakage of helium gas is minimal, a sufficient amount of helium gas remains in the repaired HDD so that the HDD can perform as designed. On the other hand, if the leak hole is larger or a plurality of leak points exist so that the repair work requires a certain amount of time, the leakage of helium gas from the DE may increase. If the amount of helium gas in the DE becomes less than a specified amount for the HDD to perform as designed, helium gas may be injected into the sealed DE again. However, much work and time are involved in disassembling the DE with the secondary cover joined by soldering or welding, which is particularly so if the cover is sealed by welding. Even in a hermetically sealed HDD which has passed the leak test in manufacture, helium gas may gradually leak out of the DE during use so that the amount of the interior helium gas may be reduced to less than the specified amount. In this case too, helium gas may be re-injected into the sealed DE of the HDD. Therefore, one embodiment of the present invention provides a method that can easily and efficiently re-enclose low density gas, such as helium gas, in the DE of an HDD after completing assembly of an HDD having low density gas previously hermetically sealed in the DE.

In accordance with embodiments of the present invention, a method for re-injecting low density gas into a disk drive having a hermetically sealed DE is subsequently described. The method includes: providing a disk drive including a hermetically sealed DE, reinjecting low density gas through a hole penetrating the hermetically sealed DE from the exterior of the disk drive to the interior of the disk drive, and then covering the hole with a sealing label including a metal layer and an adhesive layer. This achieves easy re-enclosure of the low density gas in the disk drive having a hermetic DE. In one embodiment of the present invention, the hole is created in the outer surface of the DE, and the low density gas is re-injected through the hole. This eliminates the necessity of creating a hole for re-injection of the low density gas in manufacturing the DE, which prevents lowering the manufacturing efficiency. Moreover, in another embodiment of the present invention, a protection label is attached to the outer surface of the DE, and the hole is created at a location from which the protection label is removed. This prevents formation of a leakage path by creation of a new hole. In another embodiment of the present invention, the low density gas is re-injected from the hole into the DE through a filter placed inside the DE. This prevents dust from entering the interior of the DE where components are located.

In accordance with an embodiment of the present invention, the DE includes a base, an inner cover secured to the base, and an outer cover joined to the base and covering the inner cover; the hole may be provided in the outer cover; and the low density gas may be re-injected into the base through the hole in the outer cover, a hole may be previously formed in the inner cover, and the filter may be disposed on the inside of said inner cover at a location overlapping the hole in the inner cover. This achieves easy and efficient re-injection of low density gas while preventing dust from entering the interior of the DE where components are located. As used herein, the phrase "hole may be previously formed," or alternatively, "hole previously formed" in a component, for example, the inner cover, means that the component is provided with said hole prior to gas re-injection.

In accordance with one embodiment of the present invention, the DE includes a base, an inner cover secured to the base, and an outer cover joined to the base and covering the inner cover; the DE has a re-injection part where the gap between the outer cover and the opposing surface is larger than a periphery of the re-injection part; and the hole for re-injecting the low density gas may be created within the re-injection part on the outer cover. This prevents the DE from being damaged when a new hole is created. Moreover, in another embodiment of the present invention, the inner cover may be secured to the base with a gasket interposed between the inner cover and the base, the re-injection part may be disposed inside the periphery of the gasket and includes a depression formed in the inner cover, and the hole for re-injecting the low density gas may be created at a location on the outer cover opposite the depression. This achieves a more compact shape in the DE. Alternatively, in another embodiment of the present invention, the inner cover may be secured to the base with a gasket interposed between the inner cover and the base, the re-injection part may be provided outside the periphery of the gasket, and the hole for re-injecting the low density gas is created at a location opposite a portion of the inner cover through a hole formed in the inner cover. This more securely prevents a new leakage path from being generated by creation of a new hole.

In accordance with one embodiment of the present invention, the diameter of the hole is less than or equal to 2.0 millimeters (mm); and, the diameter of the sealing label is greater than or equal to 10 mm. This achieves effective re-injection of low density gas and sealing of the hole. In another embodiment of the present invention, the hole is previously formed; the hole is covered by a sealing label including a metal thin film and an adhesive layer; the sealing label is removed and low density gas is re-injected through the hole; and the hole is covered with a new sealing label after the re-injection of the low density gas. This securely prevents the DE from being damaged and a new leakage path from being formed by creating a new hole.

In accordance with another embodiment of the present invention, a disk drive includes a hermetically sealed DE including a base and a cover joined to the base, a disk provided inside the DE, a motor for rotating the disk inside the DE, a combined head and slider, referred to herein as a combined head-slider, for accessing the disk inside the DE, a moving mechanism for supporting the combined head-slider on the base and moving the combined head-slider above the disk, low density gas sealed in the hermetically sealed DE, and a label attached so as to cover a re-injection part of the low density gas penetrating the DE from the exterior of the disk drive to the interior of the disk drive. This achieves easy re-enclosure of the low density gas in the disk drive having a hermetic DE. As used herein, the term of art, "moving mechanism," may include, without limitation thereto, an actuator, and/or associated components, for example, a pivot shaft, as is subsequently described. In another embodiment of the present invention, a second cover with a gasket is provided outside the periphery of the cover. This permits testing disk drives with the DEs temporarily sealed. Moreover, in another embodiment of the present invention, a through-hole for re-injecting the low density gas into the base is provided in the second cover. This achieves easy re-injection of the low density gas through the hole formed in the outer surface of the DE. Moreover, in another embodiment of the present invention, the cover and the second cover are bonded by an adhesive layer in which a portion of a passage connecting the re-injection part and the through-hole is formed. This reinforces the two covers and achieves effective re-injection of the low density gas. In another embodiment of the present invention, a hole is previously provided in the re-injection part and the label is a sealing label for sealing the hole. This achieves easy re-injection of the low density gas. Thus, in accordance with embodiments of the present invention, low density gas may be easily re-enclosed in a disk drive having a hermetically sealed DE.

With reference now to FIG. 1, in accordance with an embodiment of the present invention, an exploded perspective view schematically depicting the structure of the hermetically sealed HDD is shown. In accordance with an embodiment of the present invention, an HDD includes a hermetically sealed DE, in which gas with lower density than air, which is referred to herein as a low density gas, is hermetically sealed. The HDD includes a head disk assembly (HDA) 10 and a control circuit board (not shown) fixed to the outer bottom of the HDA 10. The HDA 10 includes a base 102, an inner cover 201 of a primary cover, an adhesive layer 301, and an outer cover 401 of a secondary cover, which are the main components of the DE. To the outer surface of the outer cover 401, a sealing label 411 is attached. The sealing label 411 covers a low density gas re-injection hole (not shown in FIG. 1) formed in the outer cover 401. The low density gas re-injection hole and the sealing label 411 to cover it will be described in detail later. The inner cover 201 is secured to the base 102 with screws with a gasket (not shown in FIG. 1) interposed between the inner cover 201 and the base 102. FIG. 1 shows screw holes 211a to 211f of the inner cover 201. In addition, in the inner cover 201, screw holes 211g to 211j for a spindle motor and an actuator are formed. Within the interior housing space formed by the base 102 and the inner cover 201, components constituting the HDA 10 are housed. A plurality of screw holes including the screw holes 211a to 211j in the inner cover 201 are covered with sealing labels (not shown). Further, a hole 213 to inject low density gas into the interior housing space formed by the base 102 and the inner cover 201 is formed in a depression 214. The hole 213 will be described in detail later.

Figure 2:
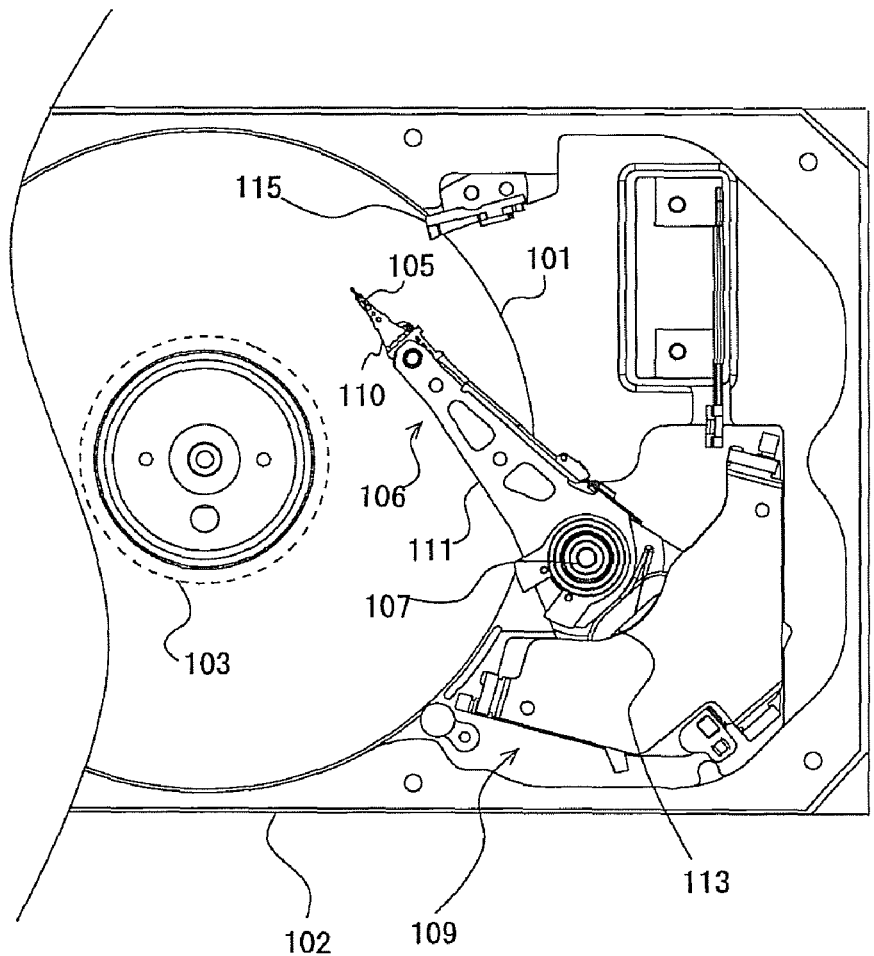
FIG. 2 is a plan view schematically depicting the internal configuration of an HDD, in accordance with an embodiment of the present invention.

With reference now to FIG. 2, in accordance with an embodiment of the present invention, the configuration within the housing space formed by the inner cover 201 and the base 102 is next described. Operation of the components in the housing space is controlled by control circuits on the control circuit board. The components of the HDD are housed in the base 102. The combined head-slider 105 includes a magnetic-recording head for writing data outputted from and/or reading data inputted to an external host (not shown) and a slider on which the magnetic-recording head is formed. The combined head-slider 105 accesses a magnetic-recording disk 101 that serves to store data, which is written by or read by the magnetic-recording head. The magnetic-recording head includes a write element for converting electric signals into magnetic fields and/or a read element for converting magnetic fields from the magnetic-recording disk 101 into electric signals.

With further reference to FIG. 2, in accordance with an embodiment of the present invention, an actuator 106 supports the combined head-slider 105 and is driven by a voice coil motor (VCM) 109 to rotate about a pivot shaft 107. The combined assemblage of the actuator 106 and the VCM 109 provides a moving mechanism for moving the combined head-slider 105. The actuator 106 includes the following components: suspension 110, an arm 111, and a flat coil 113, which are connected in this order in the longitudinal direction from the distal end of the actuator 106 where the combined head-slider 105 is placed. The VCM 109 consists of elements such as a flat coil 113 and a stator magnet (not shown). The suspension 110 and the combined head-slider 105 constitute a head gimbal assembly (HGA). A spindle motor (SPM) 103 fixed to the base 102 spins a magnetic-recording disk 101 at a specific angular rate. To read data from or write data to the magnetic-recording disk 101, the actuator 106 moves the combined head-slider 105 to the data area above the surface of the magnetic-recording disk 101. The pressure induced by the air viscosity between the air bearing surface (ABS) of the slider and the spinning magnetic-recording disk 101 balances the load applied by the suspension 110 to the slider in the direction of the magnetic-recording disk 101, which determines a fly height at which the combined head-slider 105 flies over the magnetic-recording disk 101. When the magnetic-recording disk 101 stops spinning, the actuator 106 moves the combined head-slider 105 from a data area to a ramp 115. On the other hand, embodiments of the present invention may be applied to a contact start and stop (CSS) scheme where the combined head-slider 105 is moved to park on a zone provided near the inner diameter of the magnetic-recording disk 101 where the combined head-slider 105 does not write or read data. An HDD may include one or more single-sided or double-sided magnetic-recording disks.

With reference once again to FIG. 1, in accordance with an embodiment of the present invention, the DE of the HDA 10 includes a base 102 for housing the above-described components, an inner cover 201 for covering a top opening of the base 102, an outer cover 401 disposed so as to cover the inner cover 201, and an adhesive layer 301 which is provided between the inner cover 201 and the 401 to bond the inner cover 201 to the outer cover 401. The periphery of the adhesive layer 301 is smaller than the periphery of the 401 and periphery of the inner cover 201. A slit 311, which is subsequently described in greater detail, is formed in the adhesive layer 301. The adhesive layer 301 bonds the outer cover 401 to the inner cover 201. Since the outer cover 401 is fixed by welding for example, and the size of the DE is regulated by a specification, the outer cover 401 is usually formed thinner and its strength is low. Accordingly, the adhesive layer 301 reinforces the outer cover 401 by bonding the outer cover 401 to the inner cover 201. In accordance with one embodiment of the present invention, low density gas with the density lower than air is enclosed in the sealed housing space, which suppresses turbulence and windage loss caused by the spin of the magnetic-recording disk 101 and the rotation of the actuator 106. The low density gas, which is used in the HDA 10, may be hydrogen gas or helium gas, but helium gas is more effective, stabler, and safer. The subsequent description is based on the use of helium gas, by way of example and without limitation thereto.

With further reference to FIG. 1, in accordance with an embodiment of the present invention, an HDD includes a removable inner cover 201 and an outer cover 401 to prevent leakage of helium gas, which provides for easier rework during manufacturing and effectively prevents helium gas from leaking out of the HDD in the final product. In manufacturing an HDD, the combined head-slider 105 is manufactured; and the suspension 110 is manufactured independently of the combined head-slider 105. The combined head-slider 105 is bonded to the suspension 110 to manufacture an HGA. Then, an arm 111 and a flat coil 113 is secured to the HGA to manufacture a head stack assembly (HSA), which is an assembly of the actuator 106 and the combined head-slider 105. After mounting components such as an SPM 103 and a magnetic-recording disk 101 in addition to the manufactured HSA within the base 102, the inner cover 201 is secured to the base 102 with screws.

Figure 3:
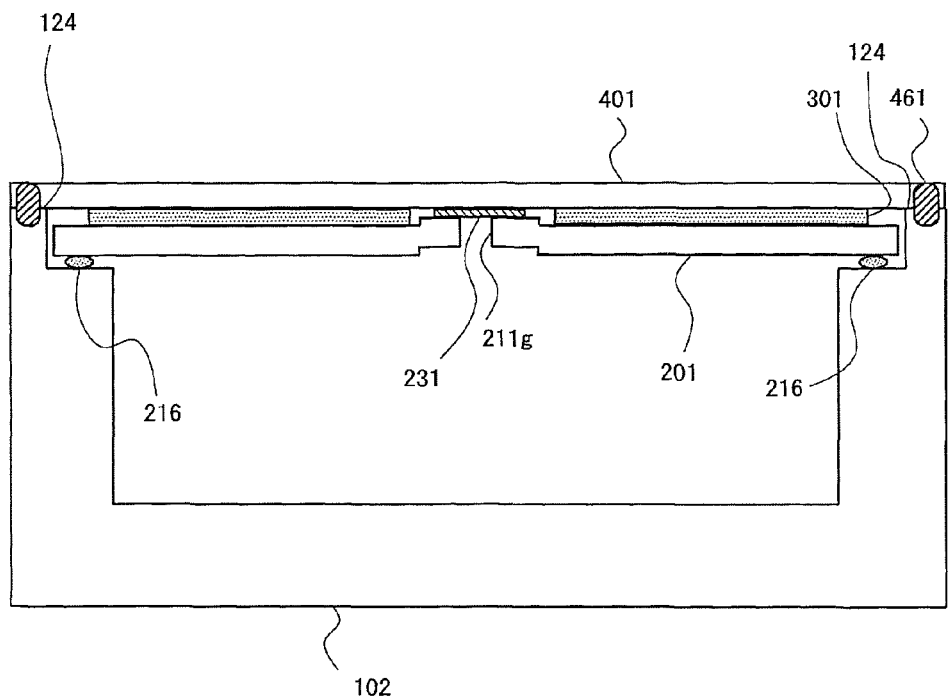
FIG. 3 is a cross-sectional view schematically showing the structure of a disk enclosure (DE) of an HDD, in accordance with an embodiment of the present invention.

With reference now to FIG. 3, in accordance with an embodiment of the present invention, a cross-sectional view schematically depicts the structure of the DE of the HDD. In FIG. 3, components in the base 102 are omitted, so as not to obscure description of embodiments of the present invention. As shown in FIG. 3, between the inner cover 201 and the base 102, a ring-shaped gasket 216 made from an elastic material such as fluororubber is provided. The inner cover 201 is made of a plate material, for example, stainless steel, aluminum, brass, or similar materials. The gasket 216 is provided on the inner cover 201 so as to surround the interior space of the base 102, forming a structure capable of temporarily keeping helium gas hermetically within the space between the base 102 and the inner cover 201. As shown in FIG. 3, a screw hole 211g for the spindle motor is sealed by a sealing label 231. After securing the inner cover with the gasket 216, which serves to fasten the gasket 216 to the base 102, helium gas is hermetically enclosed in the space formed by the inner cover 201 and the base 102. The helium gas is injected within the base 102 from the hole formed in the inner cover 201. For example, the above-described finished assembly may be placed in a chamber, the chamber may be evacuated and subsequently filled with helium gas to allow the helium gas to be injected within the hermetically enclosed space. The preceding procedure introduces helium gas into the interior through the hole 213 in the inner cover 201 and the interior space of the assembly is filled with helium gas. As used herein, the term of art "hole" may be used interchangeably with the term of art "through-hole." The assembly may then be removed from the chamber; and the hole 213 in the inner cover 201 may be covered by a sealing label (not shown). Thus, helium gas may be temporarily enclosed in the hermetic space between the base 102 and the inner cover 201.

With further reference to FIG. 3, in accordance with an embodiment of the present invention, a control circuit board may be mounted on the assembly containing the space formed by the inner cover 201 and the base 102 filled with the helium gas. Subsequently, servo writing and operational testing of the HDD may be performed before fixing the outer cover 401. Accordingly, during servo writing and operational testing of the HDD, the outer cover 401 and the adhesive layer 301 may not yet be mounted to the assembly. The operational testing of the HDD determines whether or not there are any defective parts present in the HDD that have not met the specification and levels of performance. If any defective part is detected, the HDD is returned to the prior assembly operation, the previously attached inner cover 201 is removed, and repair work, or rework, may be performed that replaces the defective part. Since the inner cover 201 is merely secured with screws, it may be easily removed, so that the rework process is not impeded.

With further reference to FIG. 3, in accordance with an embodiment of the present invention, on the other had, a HDD which has met specification and levels of performance during the testing operation may be returned to the assembly operation, whereupon the adhesive layer 301 and the outer cover 401 are mounted to the assembly. Before joining the outer cover 401, the sealing label covering the hole 213 in the inner cover 201 is removed, which provides that a leak test performed after joining the outer cover 401 to the assembly is effective. The joint between the base 102 and the outer cover 401 could be the locations where helium gas in the DE is likely to leak. To seal up a leak at such a location, the outer cover 401 is laser welded or soldered to the top surface of a ridge 124 formed on a wall of the base 102 shown in FIG. 1. A welded joint 461 between the outer cover 401 and the ridge 124 is next described in the discussion of FIG. 4.

Figure 4:
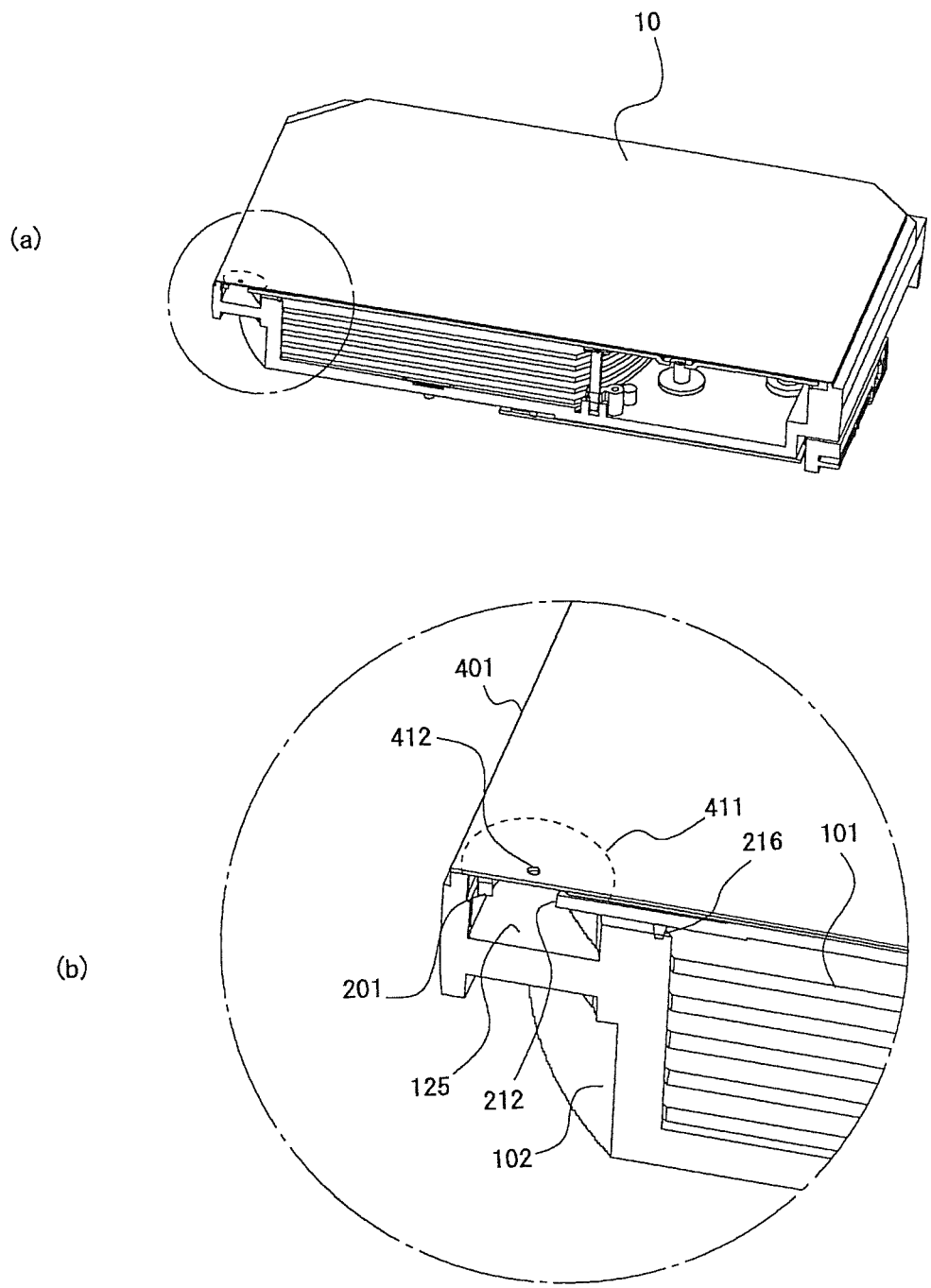
FIG. 4 are views schematically showing the structure of a helium gas re-injection hole formed in the outer cover and its vicinity, in accordance with an embodiment of the present invention.

With reference now to FIG. 4 and further reference to FIGS. 1 and 3, in accordance with an embodiment of the present invention, the ridge 124 surrounds the peripheries of the top opening of the base 102 and the inner cover 201, and the joint 461 between the outer cover 401 and the ridge 124 is formed so as to surround them. Joining the outer cover 401 provides a sealed space within the DE. In laser welding or soldering, the material of the base 102 and the outer cover 401 may be selected taking account of durability, reliability, and cost. For example, a base 102 formed by aluminum die-casting may be selected and an aluminum outer cover 401 shaped by pressing or cutting may be selected. Alternatively, a base 102 formed by cold forging an aluminum alloy containing a relatively small amount of copper and magnesium may be selected and an aluminum outer cover 401 shaped by pressing or cutting may be selected.

With further reference to FIGS. 1, 3 and 4, in accordance with an embodiment of the present invention, during the manufacture of an HDD, after the outer cover 401 is joined to the base 102, a leak test on an HDA 10 may be performed. In particular, a helium gas leak test from the joint 461 between the outer cover 401 and the base 102 may be tested for. The leak test uses a helium gas detector. A portion of the helium gas enclosed in the space between the base 102 and the inner cover 201 may escape through a hole 213 of the inner cover and stays between the outer cover 401 and the inner cover 201. If any defect is present at the joint located at the outer cover 401, helium gas may be found to leak from that location. Upon detection of a helium gas leak with the helium gas detector, the leakage point may be sealed by soldering or welding. If the amount of leakage that has occurred prior to when the leak point has been repaired is small, this is acceptable. On the other hand, if the helium gas leakage from the DE is larger, the amount of helium gas in the DE decreases to less than a regulated amount so that the HDD may show abnormal operation or not be able to deliver the desired performance. In such cases, it is necessary to re-inject helium gas and re-seal the DE of the HDA 10. Thus, in accordance with one embodiment of the present invention, the manufacturing method of an HDD re-injects helium gas whenever either helium gas leaks and the leak point is repaired, or the helium gas leakage is large and the leak point is repaired. Whether or not a specified amount of helium gas remains in the DE may be determined by measuring the electric power required for operation of the spindle motor or the actuator during the testing operation of the repaired HDA 10.

With further reference to FIGS. 1, 3 and 4, in accordance with an embodiment of the present invention, during the manufacture of an HDD, a new hole which penetrates the DE from the inside to the outside may be created at a re-injection part including a location where a helium gas re-injection hole is to be formed and its surround, and helium gas may be re-injected into the DE through the hole. After creating the hole, the hole and its surround become the re-injection part. In this way, the re-injection part is the place where the hole is to be provided and its surround, if there is not yet a hole; and, the hole and its surround, if there is a hole. After a helium gas re-injection, the hole in the re-injection part is covered with a sealing label. Thus, helium gas may be easily and hermetically resealed in the DE without disassembling the DE after joining the outer cover 401. For example, hermetically resealing helium gas may be accomplished by the following method: create a helium gas re-injection hole in the outer cover 401; place the HDA with the helium gas re-injection hole within a chamber; evacuate the chamber; and then fill the chamber with helium gas. Thus, helium gas is injected from the helium gas re-injection hole into the DE of the HDA. To increase the fill rate of helium gas, the evacuation and filling of the chamber with helium gas may be repeated several times. After completing helium gas re-injection, a sealing label 411 may be attached to the HDA to seal the helium gas re-injection hole, after the HDA has been removed from the chamber, or alternatively, while the HDA still remains within the chamber.

With further reference to FIGS. 4(a) and 4(b), in accordance with an embodiment of the present invention, perspective views of a structure of a helium gas re-injection hole 412 formed in the outer cover 401 and its surround are shown. FIG. 4(a) shows a cross-section of an HDA 10 sectioned near the re-injection hole 412. FIG. 4(b) is an enlarged view of the area surrounded by the circle in FIG. 4(a). In FIG. 4(b), the hole 412 is formed in the outer cover 401. The hole 412 may be made by using a jig such as a drill or a needle. The hole 412 penetrates the outer cover 401 to connect the outside and the inside of the DE. The area surrounded by the dashed line on the outer surface of the outer cover 401 is an area where a sealing label 411 to cover the hole 412 may be affixed. The sealing label 411 covers the whole area of the hole 412. The hole 412 is a small hole so that helium gas will not leak out through the hole 412 covered by the sealing label 411.

With further reference to FIGS. 4(a) and 4(b), in accordance with an embodiment of the present invention, at the position opposite the hole 412 of the outer cover 401, a hole 212 of the inner cover 201 may be formed. Moreover, the hole 212 of the inner cover may be formed in the portion exposed to a depression 125 of the base 102. The hole 412 of the outer cover 401 overlaps the hole 212 of the inner cover as viewed in the direction of the spindle shaft, and the outline of the hole 412 of the outer cover 401 is larger than the hole 412 of the outer cover 401. Similarly, the hole 412 of the outer cover 401 overlaps the depression 125 of the base and the periphery of the depression 125 is larger than the hole 412 of the outer cover 401 as viewed in the direction of the spindle shaft. In this way, the hole 412 of the outer cover 401 is connected to the depression 125 of the base through the hole 212 of the inner cover. Accordingly, the gap between the position of the hole 412 of the outer cover 401 and the bottom of the depression 125 of the base is larger than the peripheral portion of the depression.

With further reference to FIGS. 4(a) and 4(b), in accordance with an embodiment of the present invention, to create the hole 412 in the outer cover 401, a jig such as a drill or a needle is inserted from the outside of the outer cover 401 into the inside. In the event that there is no clearance space for the tip of the jig, the inner cover 201 under the outer cover 401 or the base 102 may be damaged. Moreover, if the inner cover 201 or the base 102 are placed directly under the position where the hole 412 is formed in the outer cover 401 and there is no space under the outer cover 401, the hole 412 may be made with difficulty using a jig. In the present example, the location where the hole 412 is formed in the outer cover 401 is opposite to the bottom of the depression 125 of the base 102 through the hole 212 of the inner cover. Accordingly, after forming the hole 412 in the outer cover 401, the tip of the jig passes through the hole 212 of the inner cover 201 to reach the depression 125. Thus, the hole 412 may be created easily and damage to the inner cover 201 or the base 102 from the jig in creating the hole 412 may be avoided.

With further reference to FIG. 4(b), in accordance with an embodiment of the present invention, the hole 412 of the outer cover 401, the hole 212 of the inner cover, and the depression 125 of the base are located outside periphery of the gasket 216 as viewed in the direction of the spindle shaft. Therefore, the hole 412 may be created more safely in the outer cover 401 without the tip of the jig touching the components located inside the periphery of the gasket 216.

Figure 5:
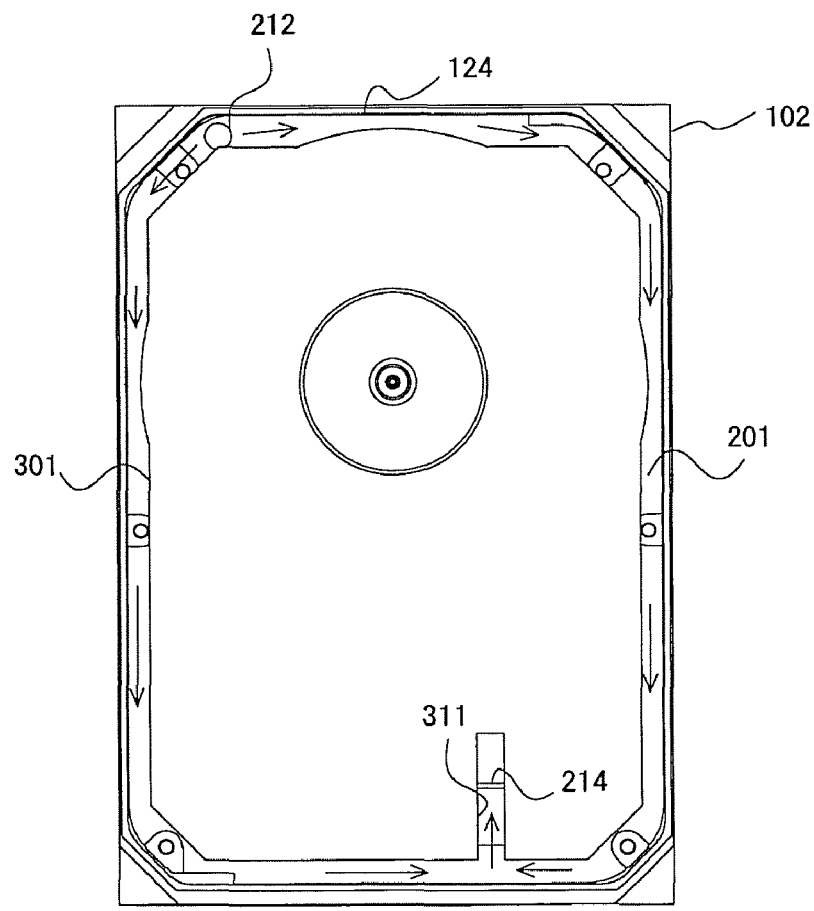
FIG. 5 is a drawing illustrating a channel of the helium gas injected from a hole in the outer cover and the flow of the helium gas, in accordance with an embodiment of the present invention.

With reference now to FIG. 5, in accordance with an embodiment of the present invention, a passage, herein also referred to as a channel, for the injection of the helium gas injected through the hole 412 of the outer cover 401 is shown schematically. FIG. 5 is a top view of the HDA 10 with the outer cover 401 removed. An inner cover 201 is secured to the base 102 and an adhesive layer 301 adheres to the inner cover 201. The hole 412 of the outer cover 401 is located at the position of the hole 213 of the inner cover shown in FIG. 5. The helium gas injected through the hole 412 of the outer cover 401 flows in the space between the adhesive layer 301 and the ridge 124 of the base 102 as shown by the arrows in FIG. 5. The helium gas enters the space between the inner cover 201 and the base 102 from a hole 213 (refer to FIG. 1) formed in the depression 214 of the inner cover 201 which is exposed through the slit 311 of the adhesive layer 301. Since there is a space between the adhesive layer 301 and the hole 213 of the inner cover 201, the adhesive layer 301 does not interfere with the helium gas entering the hole 213 of the inner cover. In this way, the adhesive layer 301 provides a portion of the channel, or passage connecting the re-injection part and the through-hole 213, for the injection of the helium gas. Thus, the adhesive layer 301 increases the strength of the inner cover 201 and the outer cover 401, and facilitates the efficient introduction of the helium gas into the base 102.

Figure 6:
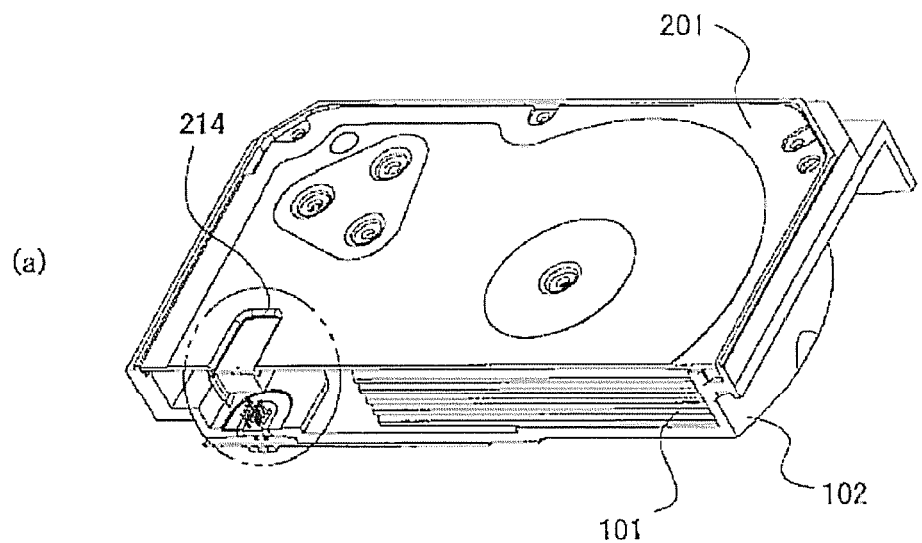
FIG. 6 are views to show the structure of the vicinity of a hole formed in the inner cover, in accordance with an embodiment of the present invention.
Figure 6:
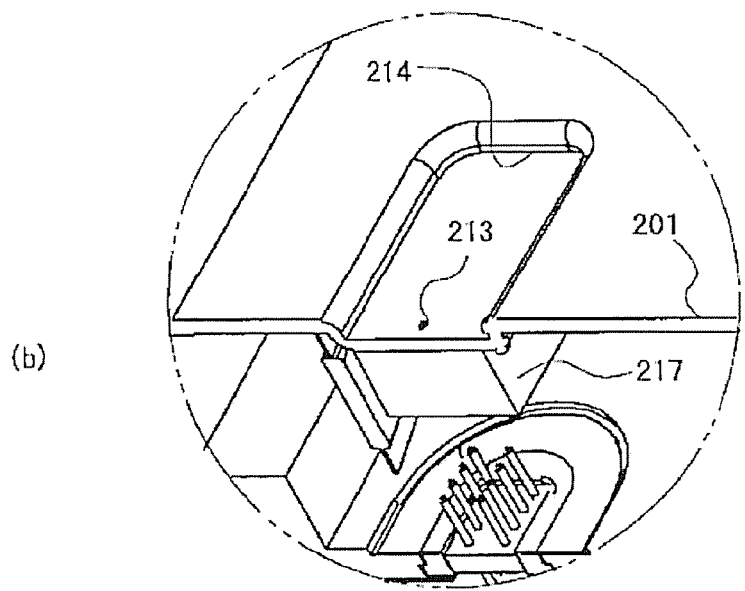

With reference now to FIGS. 6(a) and 6(b), in accordance with an embodiment of the present invention, perspective views depict the structure around the hole 213 formed in the inner cover 201. FIG. 6(a) shows a cross-section of the HDA 10 sectioned near the hole 213. FIG. 6(b) is an enlarged view of the area surrounded by the circle in FIG. 6(a). At the position overlapping the hole 213 on the inside of the inner cover 102, a filter 217 is affixed. The filter 217 prevents dust from entering the inside of the inner cover 201 from outside. Typically, the filter 217 includes a resin enclosure, a moisture absorbent inside the enclosure, and a filter member. The re-injected helium gas enters the interior space where main components are situated through the filter 217 from the hole 213. Re-injection of helium gas through the filter 217 prevents dust from entering the interior with the helium gas to improve the reliability of the helium gas re-injection process. The filter 217 may be placed at a position which is removed from the recording surface of a magnetic-recording disk and does not overlap the magnetic-recording disk. This arrangement of the filter 217 allows for a certain amount of space under the inner cover 201 at the location of the filter 217 so that misting of the magnetic-recording disk surface from helium gas directly blowing on the magnetic-recording disk may be avoided as the helium gas is admitted from the exterior of the HDA 10. In the above example embodiment of the present invention, the helium gas re-injection hole 412 is located outside periphery of the gasket 216. An example in which the helium gas re-injection hole 412 is located inside the periphery of the gasket 216 as viewed in the direction of the spindle shaft is next described.

Figure 7:
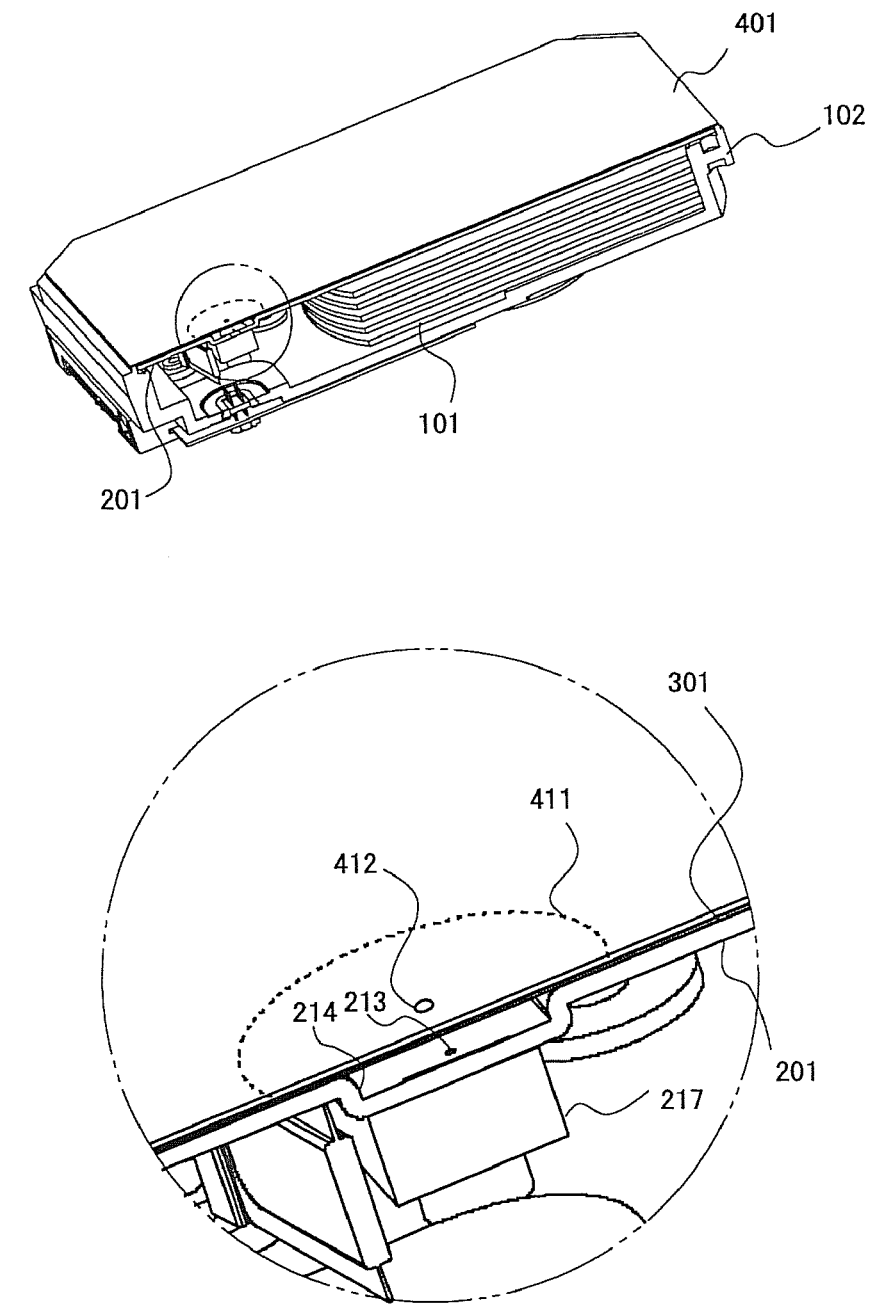
FIG. 7 are views of an HDA sectioned at the vicinity of the helium gas re-injection hole in the outer cover, in accordance with an embodiment of the present invention.

With reference now to FIGS. 7(a) and 7(b), in accordance with an embodiment of the present invention, an HDA 10 in which the helium gas re-injection hole 412 is formed at the location opposite the depression 214 of the inner cover 201 is shown. FIG. 7(a) shows an HDA 10 sectioned near the helium gas re-injection hole 412 and FIG. 7(b) is an enlarged view of the area surrounded by the circle in FIG. 7(a). The area indicated by the dashed line on the outer surface of the outer cover 401 is the attachment area of the sealing label 411. Similar to the above described example, the sealing label 411 covers the whole area of the hole 412. The hole 412 is a small-diameter hole and helium gas does not leak through the hole 412 covered with the sealing label 411. The structure of the inner cover 201 and the filter 217 shown in FIGS. 7(a) and 7(b) is the same as the one explained with reference to FIGS. 6(a) and 6(b). A depression 214 of the inner cover is provided under the hole 412 of the outer cover 401 and the surface facing the location where the hole 412 of the outer cover 401 is formed is the surface of the depression 214. Thus, the gap between the outer cover 401 and the inner cover 201 at the location where the hole 412 is formed is larger than the one in the outer peripheral area of the depression 214 of the inner cover 201. In this way, the location where the hole 412 is formed overlaps the depression 214 of the inner cover so that when the hole 412 from the outside of the outer cover 401 is made using a jig, a clearance space for the tip of the jig is provided so that the hole 412 is made safely and easily.

With further reference to FIGS. 7(a) and 7(b), in accordance with an embodiment of the present invention, the hole 412 of the outer cover 401 and the hole 213 of the inner cover 201 are provided in the space defined by the depression 214 of the inner cover 201 and the outer cover 401. Therefore, the helium gas re-injected from the hole 412 of the outer cover 401 immediately reaches the hole 213 of the inner cover and enters the interior space of the inner cover 201. For the helium gas re-injected from the hole 412 of the outer cover 201 to avoid being blocked by the adhesive layer 301, a hole connecting the hole 412 of the outer cover 401 and the hole 213 of the inner cover 201 may be previously provided in the adhesive layer 301 instead of making a new hole in the adhesive layer 301 with a jig. In the present example, the hole 412 of the outer cover 401 is formed inside the periphery of the gasket 216. Accordingly, an area where the hole 412 is to be formed outside the periphery of the gasket 216 need not be provided, so that the periphery of the HDA 10 may be made smaller. Further, since there is a depression 214 of the inner cover under the hole 412, the inner cover 201 may be prevented from being damaged by a jig. Since there is a hole 213 in the depression 214 of the inner cover 201, the area from which the adhesive layer 301 is removed to form the helium gas channel may be kept smaller. In the above described example, a hole 412 for helium gas re-injection is formed on the outer cover 401. An example in which the hole for helium gas re-injection is formed on the base 102 is next described.

Figure 8:
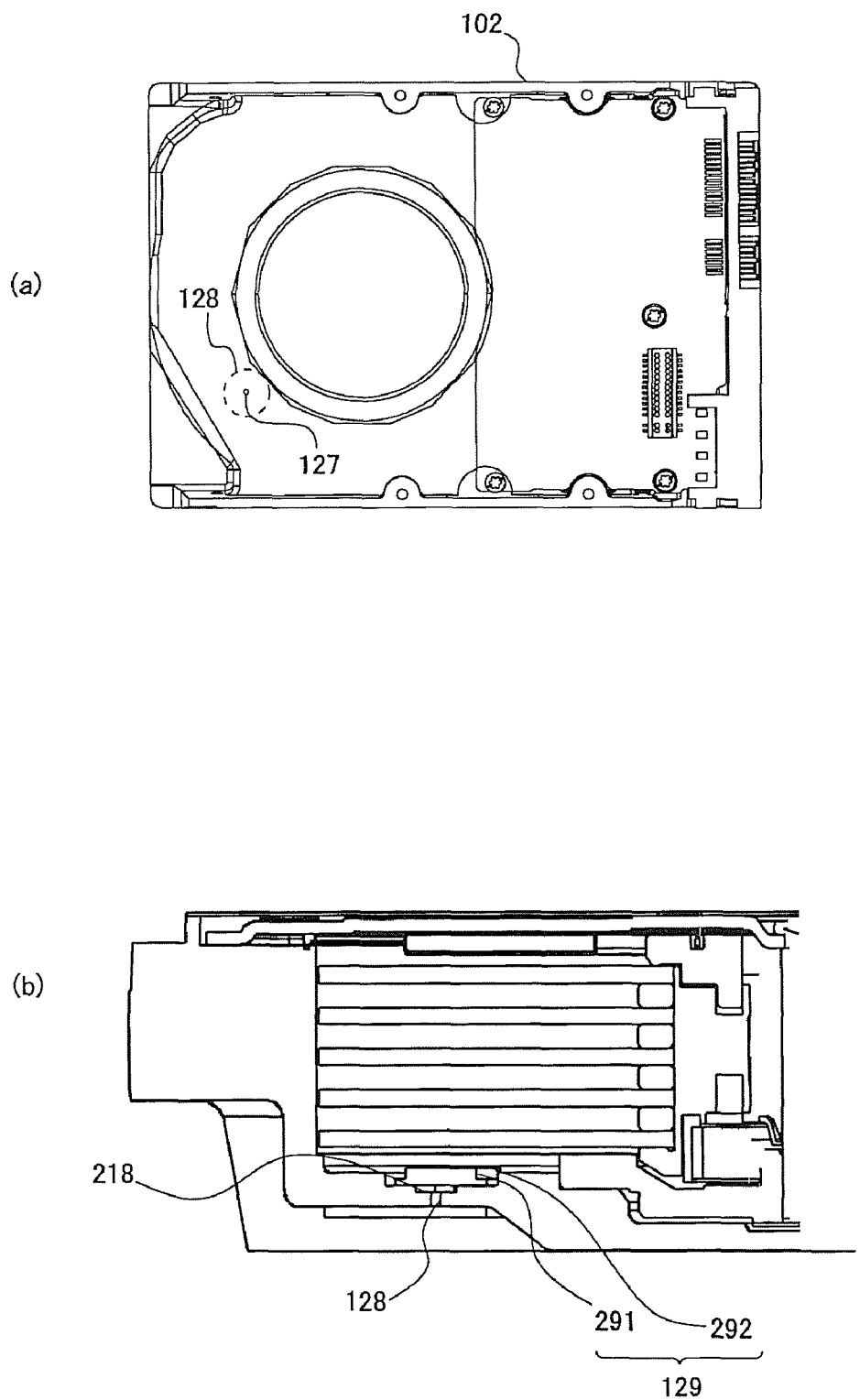
FIG. 8 are views schematically showing a hole for helium gas re-injection formed in the bottom of a base, in accordance with an embodiment of the present invention.

With reference now to FIGS. 8(a) and 8(b), in accordance with an embodiment of the present invention, a plan view of the base 102 is shown. FIG. 8(a) shows a hole 127 for helium gas re-injection formed on the bottom of the base 102. The dashed line surrounding the hole 127 represents the area to which a sealing label 128 to cover the hole 127 is affixed. FIG. 8(b) is a cross-sectional view of the base 102 sectioned at the hole 127. A filter 129 is provided so as to cover the hole 127 inside the base 102. The filter 129 includes a moisture absorbent 291 and a filter material 292; the moisture absorbent 291 is provided between the filter member 292 and the hole 127. More specifically, a groove 218 is formed on the inner bottom of the base 102 and the hole 127 is connected to the groove 218. The moisture absorbent 291 is exposed to the hole 127 and the groove 218. Helium gas entering inside of the base through the hole 127 passes along the groove 218 on the inner bottom of the base 102, diffuses into the interior space of the base 102 through the filter member 292. The re-injection method of helium gas in the above examples forms a hole on the DE of the HDA 10 and re-injects helium gas from the outside into the inside of the DE through the hole. A sealing label prevents the helium gas from leaking out from the hole by covering the hole after the re-injection. The sealing label is made of a plurality of layers including a metal layer and an adhesive layer.

Figure 9:
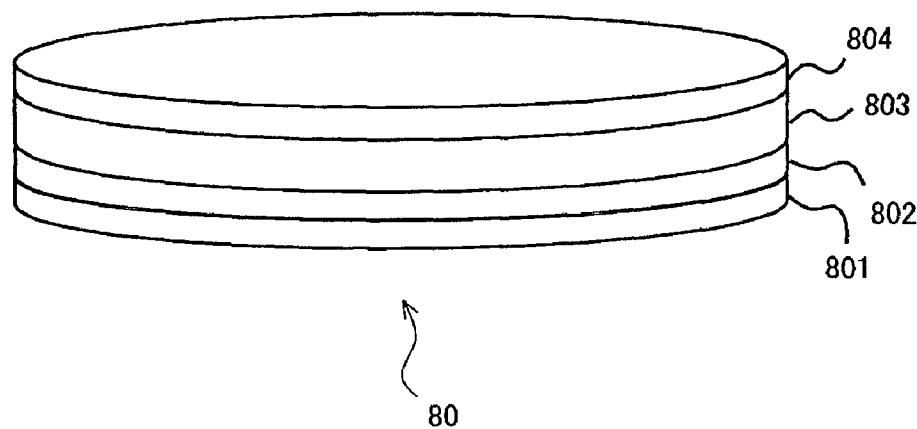
FIG. 9 is a drawing schematically showing the structure of a sealing label, in accordance with an embodiment of the present invention.

With reference now to FIG. 9, in accordance with an embodiment of the present invention, an example of the sealing label 80 is shown schematically. In FIG. 9, a sealing label 80 includes an adhesive layer 801, an inner resin layer 802, a metal layer 803, and an outer resin layer 804, which are laminated together starting with the adhesive layer in the order given. Typically, the shapes of the layers are the same. The sealing labels in the above examples are circular, but may have other shapes different from a circle. The adhesive layer 801 is typically made of acrylic resin. The metal layer 803 may be a thin layer of aluminum formed by stamping a foil or deposition of aluminum. The inner resin layer 802 and the outer resin layer 804 are typically made of polyethylene terephthalate (PET). The film thicknesses of the layers of the sealing label 80 are selected appropriate to the design. For example, a metal layer 803 of 50 micrometers (μm) and other layers of 25 μm may constitute the sealing label 80. To increase the strength of the sealing label 80 or to inhibit oxidization of the metal layer 803, the sealing label 80 may include both the inner resin layer 802 and the outer resin layer 804, but either one of the inner resin layer 802, or the outer resin layer 804, or both the inner resin layer 802 and the outer resin layer 804 may be omitted.

With further reference to FIG. 9, in accordance with an embodiment of the present invention, a protection label may be attached to the place where the helium gas re-injection hole is to be formed on the outer surface of the re-injection part of the HDA 10 and its surround. For example, the protection film may have the same configuration and size as the sealing label. As used herein, labels may include sealing labels and protection labels. If there is a scratch in the vicinity of the helium gas re-injection hole, forming a helium gas re-injection hole could lead to forming a leakage path. Then, a protection label attached to cover the place where a helium gas re-injection hole is formed and its surround, or the re-injection part, may prevent formation of a leakage path caused by forming a helium gas re-injection hole. Since re-injection of helium gas is utilized for only a portion of the manufactured HDA 10, a new hole may be made in the HDA 10, alone, to re-inject helium gas through the hole, if a helium gas leak occurs. In one embodiment of the present invention, the helium gas re-injection hole may be previously made in manufacturing components of the HDA 10. The helium gas re-injection hole may be covered with a sealing label. In an embodiment of the present invention, the helium gas re-injection process includes: removing the sealing label, re-injecting helium gas through the exposed hole, and then covering the hole with a new sealing label. A previously formed helium gas re-injection hole does not involve creating another new hole and may surely prevent components from being broken by creating the hole.

With further reference to FIG. 9, in accordance with an embodiment of the present invention, if the helium gas re-injection hole is too large, a sealing label may become detached due to a temperature change or pressure change; and helium gas may leak. Therefore, the diameter of the helium gas re-injection hole may be less than or equal to 2.0 mm. If the helium gas re-injection hole is not circular, the longest diameter may be less than or equal to 2.0 mm. The lower limit of the diameter of the helium gas re-injection hole may be determined taking account of the efficiency of the helium gas re-injection, so that, for example, the diameter may be greater than or equal to 0.1 mm. If the helium gas re-injection hole is not circular, the shortest diameter may be 0.1 mm. In one embodiment of the present invention, the size of the sealing label is large compared with the size of the helium gas re-injection hole. The size of the sealing label may be the size of the smaller of: the metal layer, and the adhesive layer. If the sealing label is circular, the size of the sealing label may be greater than or equal to 10 mm in the linear direction passing the center of the helium gas re-injection hole. If the sealing label is not circular, the smallest size in the linear direction of the sealing label may be greater than or equal to 10 mm. Measurements were conducted regarding the size of the helium gas re-injection hole and the sealing label, which are next described.

Figure 10:
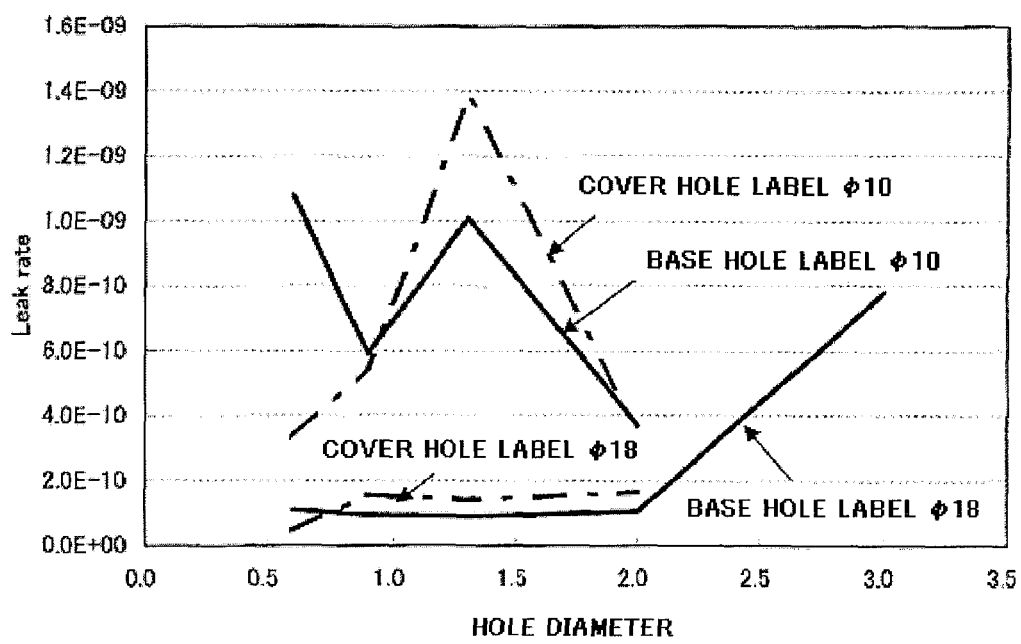
FIG. 10 shows measurements of the leak rate on HDAs when the helium gas re-injection hole is covered by circular sealing labels of 10 mm in diameter and circular sealing labels of 18 mm in diameter, in accordance with an embodiment of the present invention.

With reference now to FIG. 10, in accordance with an embodiment of the present invention, measured leak rates are shown. The leak rates were measured when the helium gas re-injection hole was covered with a circular sealing label with a 10 mm diameter and a circular sealing label with a 18 mm diameter. The sealing labels that were used in the measurement included a 50 µm adhesive layer, a 50 µm aluminum layer, and a 25 µm outer PET layer. The measurement was made on a plurality of circular holes with different diameters. The diameters in the measurement were 0.6 mm, 0.9 mm, 1.3 mm, 2.0 mm, and 3.0 mm. The measurement was made on a plurality of HDAs with holes in the bases and a plurality of HDAs with holes in the outer covers. As shown in FIG. 10, the x-axis represents the diameter of the helium gas re-injection hole and the y-axis represents the leak rate. The units of the x-axis are given in millimeters (mm); and, the units of the y-axis are given in Pascal×meters$^3$/second (Pa·m$^3$/s). Each graph of FIG. 10 represents the average of measurements made on a plurality of HDAs. In making the measurements, HDAs with helium gas re-injection holes and sealing labels of each size were placed in a chamber; the chamber was evacuated; and, the leak rates were measured with a helium detector.

With further reference to FIG. 10, in accordance with an embodiment of the present invention, the graphs show that 10 mm diameter circular sealing labels and 18 mm diameter circular sealing labels exhibited sufficient sealing performance for a helium gas re-injection hole of less than or equal to 2.0 mm in diameter. In measuring the HDAs having helium gas re-injection holes of 3.0 mm, sealing labels were removed so that the leak rates could not be measured in the HDAs except for the HDAs having circular sealing labels 18 mm in diameter and base holes. From the results, one may conclude that sealing labels with greater than or equal to 10 mm in diameter deliver sufficient sealing performance for helium gas re-injection holes that are less than or equal to 2.00 mm in diameter.

As set forth above, embodiments of the present invention have been described by way of specific examples, without limitation thereto. A person skilled in the art may easily modify, add, and convert each element in an embodiment of the present invention as described above within the spirit and scope of embodiments of the present invention. Specifically, for example, embodiments of the present invention may be particularly useful for HDDs but may also be applied to other types of disk drives. The outer cover and the base may be joined by soldering, or by welding, but other methods of joining are not particularly excluded from the spirit and scope of embodiments of the present invention. Depending on the type of design, the adhesive layer may not be utilized for some embodiments of the present invention. Also, embodiments of the present invention, may be applied to a disk drive which does not have an inner cover. Moreover, in accordance with the embodiments of the present invention described above, a disk drive including a non-volatile memory with a limited number of overwrites may be continued to be efficiently used as a non-volatile memory, even when a replaceable region in the non-volatile memory has been exhausted.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for re-injecting low density gas into a disk drive having a hermetically sealed disk enclosure, said method comprising:
   providing a disk drive including a hermetically sealed disk enclosure;
   re-injecting low density gas through a hole penetrating said hermetically sealed disk enclosure from an exterior of said disk drive to an interior of said disk drive;

covering said hole with a sealing label including a metal layer and an adhesive layer, wherein said hole is created in an outer surface of said hermetically sealed disk enclosure and said low density gas is re-injected through said hole, wherein said disk enclosure comprises:
- a base, an inner cover secured to said base, and an outer cover joined to said base and covering said inner cover;
- said disk enclosure has a re-injection part where a gap between said outer cover and an opposing surface is larger than a periphery of said re-injection part; and
- said hole for re-injecting said low density gas is created within said re-injection part on said outer cover;
- wherein said inner cover is secured to said base with a gasket interposed between said inner cover and said base;
- said re-injection part is disposed inside the periphery of said gasket and includes a depression formed in said inner cover; and
- said hole for re-injecting said low density gas is created at a location on said outer cover opposite said depression.

2. The method according to claim 1, wherein a protection label is attached to said outer surface of said disk enclosure; and
said hole is created at a location from which said protection label is removed.

3. The method according to claim 1, wherein said low density gas is re-injected through said hole into said disk enclosure through a filter placed inside said disk enclosure.

4. The method according to claim 3, wherein
said hole is provided in said outer cover; and
said low density gas is re-injected into said base through said hole in said outer cover, a previously formed hole in said inner cover, and said filter disposed on the inside of said inner cover at a location overlapping said hole in said inner cover.

5. The method according to claim 1, wherein a diameter of said hole is less than or equal to 2.0 mm.

6. The method according to claim 5, wherein a diameter of said sealing label is greater than or equal to 10 mm.

7. The method according to claim 1, wherein said hole is previously formed;
said hole is covered by a sealing label comprising a metal thin film and an adhesive layer;
said sealing label is removed and low density gas is re-injected through said hole; and
said hole is covered with a new sealing label after said re-injection of said low density gas.

8. A method for re-injecting low density gas into a disk drive having a hermetically sealed disk enclosure, said method comprising:
providing a disk drive including a hermetically sealed disk enclosure;
re-injecting low density gas through a hole penetrating said hermetically sealed disk enclosure from an exterior of said disk drive to an interior of said disk drive;
covering said hole with a sealing label including a metal layer and an adhesive layer, wherein said hole is created in an outer surface of said hermetically sealed disk enclosure and said low density gas is re-injected through said hole, wherein said disk enclosure comprises:
- a base, an inner cover secured to said base, and an outer cover joined to said base and covering said inner cover;
- said disk enclosure has a re-injection part where a gap between said outer cover and an opposing surface is larger than a periphery of said re-injection part; and
- said hole for re-injecting said low density gas is created within said re-injection part on said outer cover;
- wherein said inner cover is secured to said base with a gasket interposed between said inner cover and said base;
- said re-injection part is disposed outside the periphery of said gasket; and
- said hole for re-injecting said low density gas is created at a location opposite a portion of said inner cover including a hole formed in said inner cover.

* * * * *